US006369472B1

(12) United States Patent
Grimm et al.

(10) Patent No.: US 6,369,472 B1
(45) Date of Patent: Apr. 9, 2002

(54) DEVICE FOR ACQUIRING OPERATING PARAMETERS OF AN ELECTRIC MOTOR

(75) Inventors: Wolfgang Grimm; Wolf-Henning Rech, both of Leonberg; Markus Klausner, Chemnitz, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/062,800

(22) Filed: Apr. 20, 1998

(30) Foreign Application Priority Data

Apr. 19, 1997 (DE) ........................................ 197 16 520

(51) Int. Cl.[7] ........................... H02K 7/00; G05B 23/02
(52) U.S. Cl. ................... 310/67 R; 318/565; 388/907.5
(58) Field of Search ................................ 310/67 R, 66, 310/68 R, DIG. 6; 318/565, 685; 388/815, 907.5, 909, 828

(56) References Cited

U.S. PATENT DOCUMENTS 3,889,459 A * 6/1975 Lu ................................ 58/23
4,222,226 A * 9/1980 Miyatake et al. ........... 368/113
4,264,848 A * 4/1981 Jansen ........................ 318/565
4,296,409 A * 10/1981 Whitaker et al. ........... 340/684
4,551,703 A * 11/1985 Bourauel et al. ......... 340/52 D
4,779,031 A * 10/1988 Arends et al. .............. 318/565
4,812,876 A * 3/1989 Nawata .................... 355/14 R
4,920,549 A * 4/1990 Dinovo ........................ 377/16
4,939,437 A * 7/1990 Farag et al. ................ 318/473
4,976,338 A * 12/1990 Hollands .................... 187/110
5,038,088 A * 8/1991 Arends et al. .............. 318/565
5,214,559 A * 5/1993 Zerbian et al. ............... 361/93
5,713,724 A * 2/1998 Centers et al. ................ 417/53
5,715,905 A * 2/1998 Kaman ....................... 180/287
5,726,911 A * 3/1998 Canada et al. .............. 364/550
5,844,473 A * 12/1998 Kaman ....................... 340/439
5,852,351 A * 12/1998 Canada et al. .............. 318/490
5,883,455 A * 3/1999 Fukasawa et al. ............ 310/91

* cited by examiner

*Primary Examiner*—Nestor Ramirez
*Assistant Examiner*—Dang Dinh Le
(74) *Attorney, Agent, or Firm*—Kenyon & Kenyon

(57) ABSTRACT

A device for acquiring operating parameters on electric motors with an arrangement that is influenced by an effect of at least one operating parameter of an electric motor. The arrangement is designed to store and display the effect. To obtain reliable information regarding the recyclability of the electric motor, the operating time and/or the number of motor starts can be detected by an electronic circuit and stored in a memory from which respective data can be read out and analyzed at a proper time.

20 Claims, 2 Drawing Sheets

DEVICE FOR ACQUIRING OPERATING PARAMETERS OF AN ELECTRIC MOTOR

FIELD OF THE INVENTION

The present invention relates to a device for acquiring operating parameters of an electric motor, such as a number of motor starts and a number of operating hours, and optionally for acquiring other operating characteristics of an electric motor to provide reliable information regarding whether the electric motor can be reused after a certain operating time or must be discarded.

BACKGROUND INFORMATION

Electric A.C. or D.C. motors used in conventional engineering systems may under some circumstances be reusable in a new engineering system at the end of the lifetime of the engineering system if the service time of the customer's electric motor is considerably shorter than the manufacturer's indicated useful life. A procedure to reuse the electric motor (i.e., controlled product recycling) is already being utilized for copiers, for example. However, such recycling has previously required extensive testing to permit reusability to be reliably determined. For example, to use this procedure with the copiers as described above, an expensive acoustic noise analysis is performed to obtain a reliable statement about product recycling. With electric motors, it has been customary to perform extensive measurements in an expensive procedure, and to also (optionally) perform stress tests to be able to obtain a statement regarding product recyclability.

SUMMARY OF THE INVENTION

The present invention uses a completely different procedure and provides a device for acquiring operating parameters on electric motors with means (e.g., an arrangement) being influenced by at least one operating parameter. This means is designed to store any wearing effect on the motor and optionally display this effect. A number of motor starts and a number of operating hours, and optionally other operating characteristics relevant to the expected lifetime of an electric motor, are taken into account to obtain a decision regarding the reusability of the electric motor from a standpoint of product recycling. In addition, the knowledge of the status or state of these operating characteristics can be utilized in service/maintenance and market research. In particular, the reusability of the respective electric motor can be determined directly from a knowledge of the parameters, such as "number of motor starts" and "number of hours of operation", without any expensive test procedures.

The means for the electric motor operating parameters acquisition device storing and displaying the effects of the operating parameters can be implemented in a number of different ways, e.g., as mechanical, electro-mechanical or electronic means based on physical, chemical or physico-chemical effects. Such means is thus designed in the form of a liquid in a container, for example. This liquid is exposed to the heat of operation of the electric motor and is thereby evaporated, so that the recyclability of the electric motor can be determined at any time from the remaining amount of the liquid.

The means can also be provided in the form of an electronic circuit for recording the hours of operation and/or the number of starts of the electric motor, and preferably for recording both the hours of operation and the motor starts. Other operating parameters (e.g., power consumption, temperature, etc.) may also be recorded.

The circuit of the data acquisition device according to the present invention is provided with a time base on the basis of which the operating voltage and/or the motor starts is/are recorded. The time base may be an RC oscillator with a simple design (i.e., an oscillator without a quartz oscillator) because high accuracy and absolute time determination by the time base are not necessary.

Information regarding the hours of operation and the motor starts of the electric motor is preferably stored in a PROM or EPROM memory, the elements of which are written into or destroyed as a function of the motor start.

According to a further embodiment of the present invention, a read-write logic is also provided for storing the "motor start" and "motor run" states during the operating time of the electric motor.

The circuit of the data acquisition device according to the present invention may also have a readout circuit for stored operating parameters to permit a readout of the operating parameters via an appropriate external device and an optional analysis at the end of the operating time or when a decision is to be made about product recycling.

To be able to mount the data acquisition device according to the present invention on the respective electric motor without utilizing a large amount of space, the components of the circuit can be accommodated in an integrated circuit.

The present invention also relates to an electric motor equipped with the data acquisition device, which is preferably designed in the form of a module or integrated into the electric motor and may also have a diagnostic connection to permit a problem-free transfer of the operating parameters stored in the circuit to an external analysis device.

DETAILED DESCRIPTION

Figure 1:
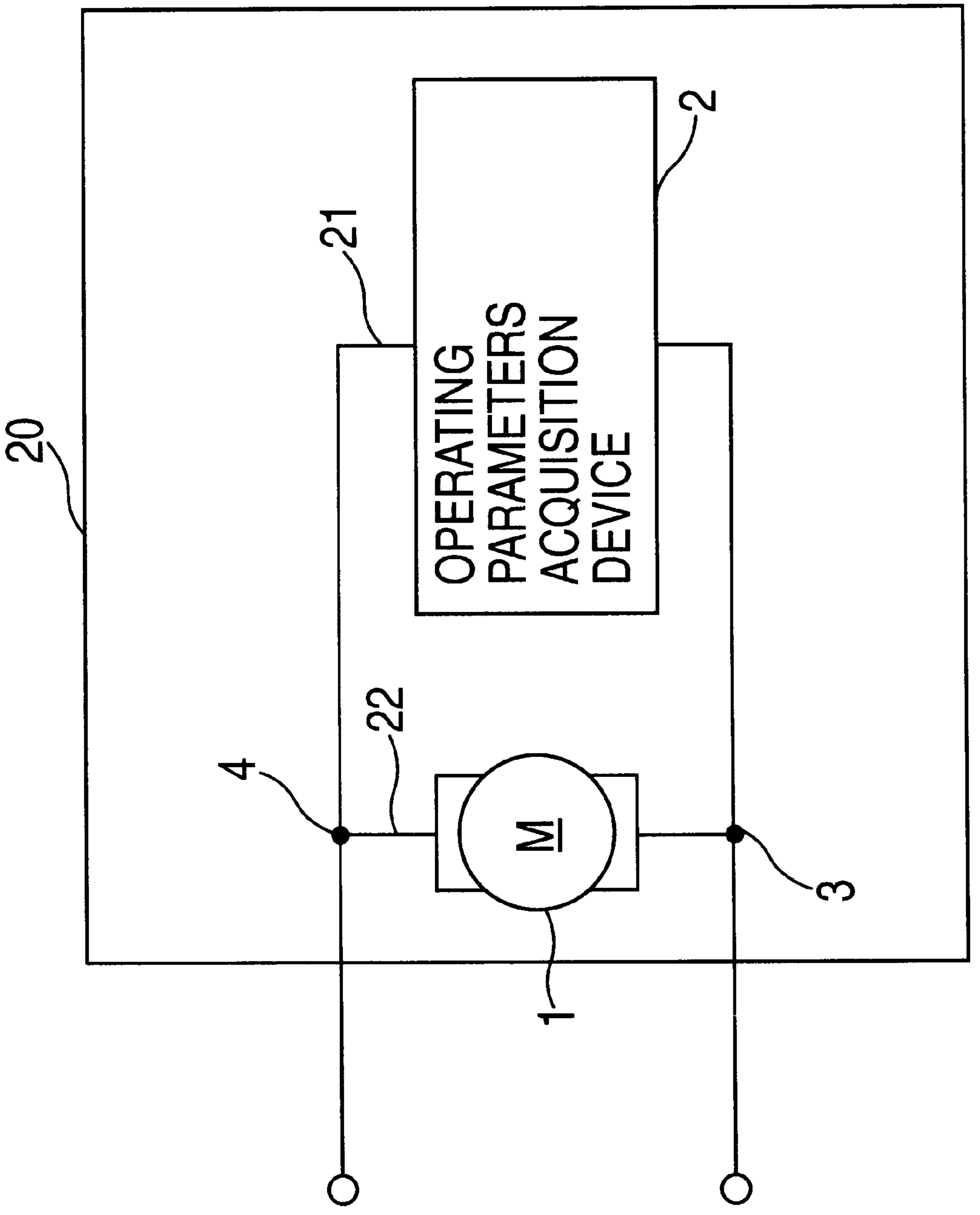
FIG. 1 shows a schematic diagram of an electric motor provided with an operating parameters acquisition device according to the present invention.
Figure 2:
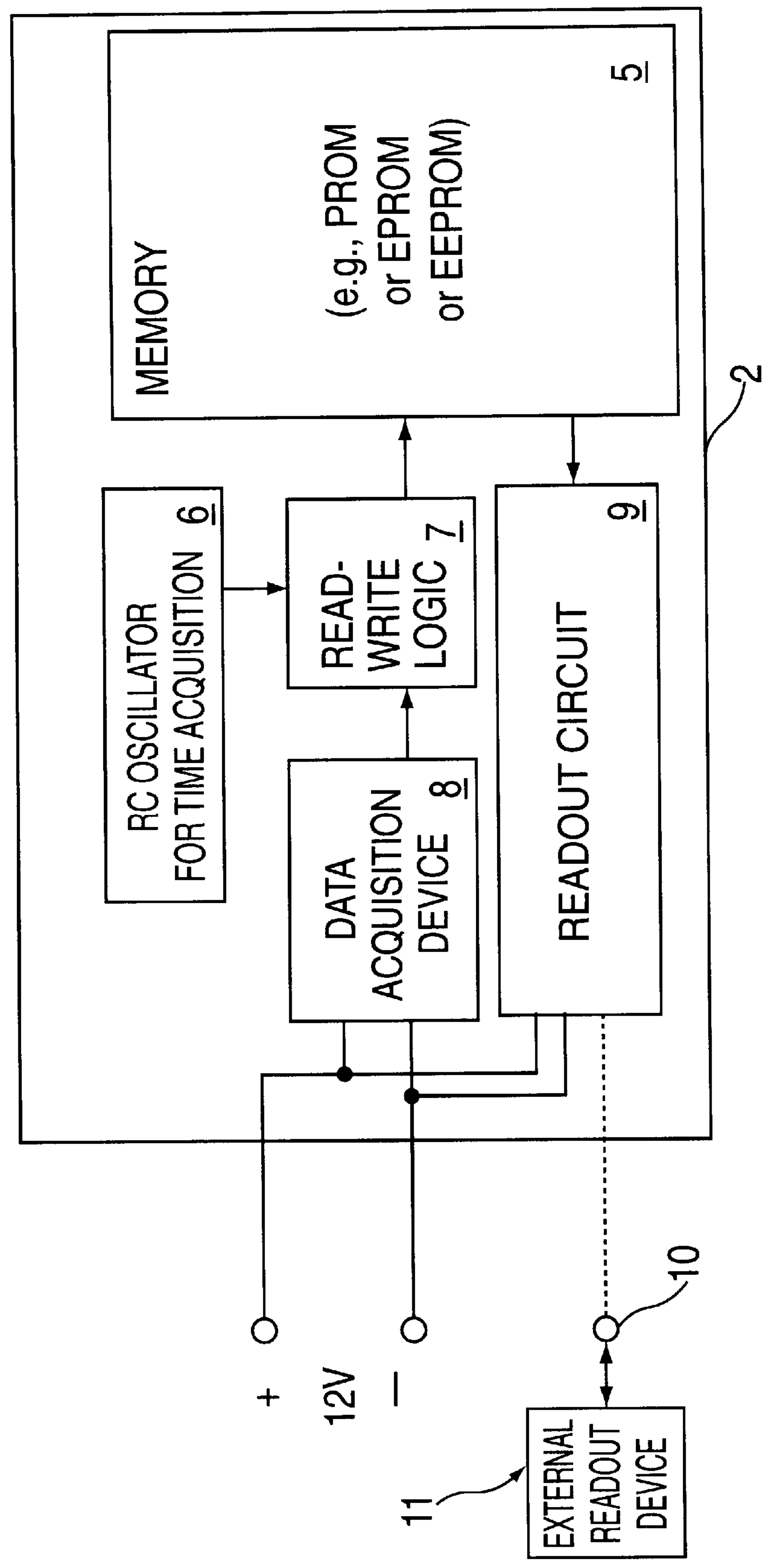
FIG. 2 shows a block diagram of an exemplary embodiment of the operating parameters acquisition device according to the present invention.

Electric motor 1 shown in FIG. 1 is, e.g., a 12 V D.C. motor having terminals 3 and 4 for connecting to an exemplary operating parameters acquisition device according to the present invention, which is illustrated as a circuit 2 and shown in detail in FIG. 2. For example, the operating parameters acquisition device can be designed for detecting two operating parameters. Other operating parameters or additional operating parameters may also be acquired. The operating voltage of the operating parameters acquisition device or circuit 2 (shown as 21 in FIG. 1) can be identical to the power supply voltage of electric motor 1 (shown as 22 in FIG. 1), so that no separate measures need be taken to supply power to the operating parameters acquisition device. As shown in FIG. 1, a single integrated module 20 includes the operating parameter acquisition device 2 and the electric motor 1.

FIG. 2 shows the operating parameters acquisition device illustrated in FIG. 1, which is designed as electronic circuit 2, has a memory 5 in the form of a PROM or (E)EPROM array whose elements are written or destroyed with each start of electric motor 1. Furthermore, a simple RC oscillator 6 is provided as a time reference for determining the approximate operating time. A high-frequency quartz oscillator for the time reference is not required for the present invention because accuracy and absolute time are not essential in ascertaining the recyclability of electric motor 1. It is sufficient to be able to determine the approximate operating time of the electric motor in hours using the time reference in the form of RC oscillator 6.

RC oscillator 6 acts on a read-write logic (arrangement) 7 for storing the states "motor start" and "motor run" during the operating time of electric motor 1. The output signals of read-write logic 7 are also fed into memory 5. In addition, read-write logic 7 receives a signal from a data acquisition device 8 which is connected in parallel to terminals 3, 4 of electric motor 1.

A readout circuit 9 reads out the contents of memory 5, and the readout results are displayed, for example, on a display (not shown), which is preferably integral with device 2, or on an external device, via a connection 10 which may optionally be connected to the output of readout circuit 9. Thus, after the end of the life cycle of the engineering system in which electric motor 1 was used, its operating parameters are read out and analyzed via a suitable external device.

To permit an inexpensive analysis of the operating parameters with existing components, up to 1000 motor starts (each with ten "motor run after motor start states"), should be stored for a typical electric motor, because reuse is usually no longer relevant after more than 1000 starts. For a typical EEPROM, 1000×10=10,000 write operations can be easily handled. However, the type of data storage and analysis will depend on a specific application. For example, only the number of starts is relevant for a window opener motor for a motor vehicle, whereas only the number of hours of operation are relevant for a washing machine motor. Application-specific characteristics are taken into account using an appropriate parameterization in read-write logic 7 and using a limit mass production of the exemplary operating parameters acquisition device according to the present invention in the form of circuit 2 shown in FIG. 2.

The operating parameters acquisition device described above for an electric motor 1 can be implemented very inexpensively and makes it possible to quickly obtain, in a cost-effective manner and without the use of expensive test methods, reliable information about the basic reusability of an electric motor at the end of the service life of a system within which the electric motor has carried out its function. A typical application would be, for example, for a battery-powered screwdriver motor. In this case, the readout is obtained by plugging an external readout device 11 into service terminal 10 of operating parameters acquisition device 2 according to the present invention. The number of motor starts and/or the hours of operation of the motor are analyzed with respect to the typical operating time according to the manufacturer. In addition, the history of other, e.g., mechanical components can be deduced from this data. Thus, for example, a comparison of the operating parameters thus obtained, such as power consumption and operating time, with empirical data permits a deduction regarding the area of application of the electric motor. If the data is compiled for the electric motor of a drill, for example, it is possible to determine from the data which materials have been handled. A high power consumption and a short operating time would indicate that very hard materials were drilled. Other analyses are of course also conceivable. An external readout device 11, which is designed as a computer, permits any combination and display of the data compiled.

What is claimed is:

1. A device for acquiring at least one operating parameter of an electric motor, comprising:

an arrangement including an electronic circuit implemented as an integrated circuit, the electronic circuit including an electronic memory and including an oscillator, the oscillator providing an output forming a time base, wherein the arrangement is influenced by the at least one operating parameter, and wherein the electronic circuit stores hours of operation of the electric motor as a function of the output of the oscillator.

2. The device according to claim 1, wherein the arrangement responds to and stores at least one of a physical effect, a chemical effect and a physicochemical effect of the electric motor.

3. The device according to claim 1, wherein the electronic circuit records motor starts of the electric motor.

4. The device according to claim 3, wherein the electronic circuit is coupled in parallel to terminals of the electric motor.

5. The device according to claim 3, wherein the electronic memory includes elements responding to each of the motor starts.

6. The device according to claim 5, wherein the electronic memory includes one of a PROM array and an EPROM array, elements of one of the PROM array and the EPROM array being one of written into and destroyed as a function of the motor starts.

7. The device according to claim 3, wherein the electronic device includes a read-write logic unit storing a motor start state and a motor run state when the electric motor is operating.

8. The device according to claim 3, wherein the electronic device includes a read-write logic unit storing further operating parameters when the electric motor is operating.

9. The device according to claim 8, wherein the further operating parameters include at least one of temperature parameters and power consumption parameters.

10. The device according to claim 1, wherein the electronic circuit is coupled in parallel to terminals of the electric motor.

11. The device according to claim 1, wherein the electronic circuit is supplied with a first voltage, and the electric motor is supplied with a second voltage, wherein the first voltage is substantially the same as the second voltage.

12. The device according to claim 1, wherein the electronic circuit records at least one of an operating voltage and motor starts of the electric motor as a function of the output of the oscillator.

13. The device according to claim 1, wherein the electronic device includes a readout circuit outputting the at least one operating parameter.

14. The device according to claim 1, wherein components of the electronic circuit are integrated into the integrated circuit.

15. The device according to claim 1, wherein the electronic circuit includes a readout circuit, and wherein the readout circuit is coupled to a terminal for outputting and analyzing the at least one operating parameter.

16. A device for acquiring at least one operating parameter of an electric motor for determining the reusability of the electric motor, the device being usable with a liquid situated in a container and exposed to a heat of operation of the electric motor, the liquid being evaporated by the heat of operation of the electric motor, the device comprising:

an arrangement including an electronic circuit implemented as an integrated circuit, the electronic circuit including an electronic memory and including an oscillator, the oscillator providing an output forming a time base;

wherein the arrangement is influenced by the at least one operating parameter; and wherein the electronic circuit stores hours of operation of the electric motor as a function of the output of the oscillator.

17. An arrangement, comprising:

an electric motor providing at least one operating parameter; and a device connected to the electric motor, the device receiving the at least one operating parameter and including an electronic circuit provided in an integrated circuit, the electronic circuit including an oscillator and an electronic memory, wherein the electronic circuit is affected by the at least one operating parameter, and wherein the electronic circuit stores hours of operation of the electric motor using an output of the oscillator.

18. The arrangement according to claim 17, wherein the electric motor and the device form a module.

19. The arrangement according to claim 17, wherein the electric motor provides the at least one operating parameter to an external analysis unit via a diagnostic terminal.

20. A device for acquiring at least one operating parameter of an electric motor for the purpose of determining the reusability of the electric motor, the device comprising:

an arrangement including an electronic circuit implemented as an integrated circuit, the electronic circuit including an electronic memory and including an oscillator, the oscillator providing an output forming a time base;

wherein the arrangement is influenced by the at least one operating parameter; and wherein the electronic circuit stores hours of operation of the electric motor as a function of the output of the oscillator.

* * * * *